United States Patent
Vecera et al.

(10) Patent No.: US 9,652,365 B2
(45) Date of Patent: May 16, 2017

(54) FAULT CONFIGURATION USING A REGISTERED LIST OF CONTROLLERS

(75) Inventors: Martin Vecera, Brno (CZ); Jiri Pechanec, Brno (CZ)

(73) Assignee: Red Hat, Inc., Raleigh, NC (US)

(*) Notice: Subject to any disclaimer, the term of this patent is extended or adjusted under 35 U.S.C. 154(b) by 777 days.

(21) Appl. No.: 12/862,024

(22) Filed: Aug. 24, 2010

(65) Prior Publication Data

US 2012/0054532 A1 Mar. 1, 2012

(51) Int. Cl.
*G06F 11/07* (2006.01)
*G06F 11/36* (2006.01)

(52) U.S. Cl.
CPC ................ *G06F 11/3676* (2013.01)

(58) Field of Classification Search
CPC ..................... G06F 11/36–11/3696
USPC ...................... 714/25–57; 717/124
See application file for complete search history.

(56) References Cited

U.S. PATENT DOCUMENTS

| | | | | |
|---|---|---|---|---|
| 6,477,666 B1* | 11/2002 | Sanchez | ............. | G06F 11/3688 714/38.12 |
| 6,484,276 B1* | 11/2002 | Singh | ................... | G06F 11/263 714/38.13 |
| 6,625,804 B1* | 9/2003 | Ringseth et al. | ............. | 717/114 |
| 6,701,460 B1* | 3/2004 | Suwandi et al. | ................ | 714/41 |
| 7,072,934 B2* | 7/2006 | Helgeson et al. | ............ | 709/203 |
| 7,120,559 B1* | 10/2006 | Williams et al. | ............. | 702/185 |
| 7,451,349 B2* | 11/2008 | Tsai et al. | ....................... | 714/27 |
| 7,451,351 B2* | 11/2008 | Gunnmarker et al. | ...... | 714/38.1 |
| 7,516,025 B1* | 4/2009 | Williams et al. | ............... | 702/57 |
| 7,543,275 B2* | 6/2009 | Kuturianu et al. | ........... | 717/124 |
| 7,613,961 B2* | 11/2009 | Barr et al. | ..................... | 714/718 |
| 7,657,789 B1* | 2/2010 | Gerber et al. | ................... | 714/25 |
| 7,757,124 B1* | 7/2010 | Singh et al. | .................... | 714/32 |
| 7,757,215 B1* | 7/2010 | Zhou et al. | ................... | 717/124 |
| 8,141,042 B2* | 3/2012 | Gan et al. | ..................... | 717/121 |
| 8,195,982 B2* | 6/2012 | Marchant et al. | .............. | 714/32 |
| 8,561,034 B2* | 10/2013 | Belapurkar et al. | .......... | 717/130 |
| 2003/0037289 A1* | 2/2003 | Singh et al. | .................... | 714/38 |
| 2004/0024938 A1* | 2/2004 | Bian et al. | .................... | 710/260 |
| 2005/0102656 A1* | 5/2005 | Viehland et al. | ............. | 717/130 |

(Continued)

OTHER PUBLICATIONS

Kashif Hameed, Rob Williams, Jim Smith (2010). Aspect Oriented Software Fault Tolerance and Analytically Redundant Design Framework. 2010 International Conference on Dependable Systems and Networks Workshops. 38-44.*

(Continued)

*Primary Examiner* — Peter Choi
*Assistant Examiner* — Alissa Karmis
(74) *Attorney, Agent, or Firm* — Lowenstein Sandler LLP

(57) ABSTRACT

A method and system dynamically configures faults during software testing. During runtime of a service platform, a computer system hosting the service platform receives a request from a test program to register a list of controllers. Each of the registered controllers controls the generation of a different fault. The test program triggers the execution of a service to be tested on the service platform. During execution of the service, a predefined condition is encountered. A fault is generated if one of the registered controllers controls the fault generation associated with the predefined condition. Based on the generation of the fault, the behavior of the service can be verified.

19 Claims, 5 Drawing Sheets

(56) References Cited

U.S. PATENT DOCUMENTS

| | | | |
|---|---|---|---|
| 2005/0246716 A1* | 11/2005 | Smith et al. ................ | 719/315 |
| 2006/0129880 A1* | 6/2006 | Arcese ............... | G06F 11/3672 |
| | | | 714/11 |
| 2006/0271825 A1* | 11/2006 | Keaffaber et al. ............. | 714/38 |
| 2008/0114937 A1* | 5/2008 | Reid et al. .................... | 711/117 |
| 2008/0134160 A1* | 6/2008 | Belapurkar et al. .......... | 717/154 |
| 2008/0141335 A1* | 6/2008 | Thomas ........................... | 726/1 |
| 2008/0155328 A1* | 6/2008 | Chakraborty ................... | 714/32 |
| 2008/0178044 A1* | 7/2008 | Showalter et al. ............. | 714/34 |
| 2008/0215925 A1* | 9/2008 | Degenaro et al. ............. | 714/41 |
| 2008/0244513 A1* | 10/2008 | January et al. ............... | 717/113 |
| 2009/0249021 A1* | 10/2009 | Morris ......................... | 711/202 |
| 2009/0292877 A1* | 11/2009 | Piper et al. .................... | 711/118 |
| 2009/0313599 A1* | 12/2009 | Doddavula et al. .......... | 717/102 |
| 2010/0057403 A1* | 3/2010 | Vecera et al. ................. | 702/186 |
| 2010/0198799 A1* | 8/2010 | Krishnan et al. ............. | 707/702 |
| 2010/0262952 A1* | 10/2010 | Colton et al. ................. | 717/118 |
| 2010/0287412 A1* | 11/2010 | Cha .................... | G06F 11/3688 |
| | | | 714/35 |
| 2011/0040915 A1* | 2/2011 | Strauss ................ | G06F 9/4818 |
| | | | 710/267 |
| 2011/0113054 A1* | 5/2011 | McLean et al. ............. | 707/769 |
| 2011/0295922 A1* | 12/2011 | Vecera et al. ................ | 709/201 |
| 2012/0210304 A1* | 8/2012 | Maeno ......................... | 717/121 |

OTHER PUBLICATIONS

Barbosa R (2004). Fault Injection Optimization through Assembly-Level Pre-Injection Analysis. Master's Thesis. 1-64.*

*Fault Injection Testing—First Steps with JBoss Byteman*, submitted by Len DiMaggio on Oct. 16, 2009, http://java.dzone.com/news/fault-injection-testing-first?mz-3006-jboss, 4 pp.

\* cited by examiner

FAULT CONFIGURATION USING A REGISTERED LIST OF CONTROLLERS

TECHNICAL FIELD

Embodiments of the present invention relate to software testing, and more specifically, to software testing using fault injection.

BACKGROUND

Fault injection is a software testing technique that improves the coverage of a test by introducing faults to rarely-visited code paths. For example, some error handling code paths are seldom invoked and their behaviors can be difficult to be verified. Additionally, fault injection is an important tool for evaluating the dependability of a software product. A software designer needs to understand the software product's behavior in response to faults to evaluate whether the software is capable of handling the faults.

Conventionally, faults injected into a test code are manually programmed into the test code by a programmer. The test code needs to be recompiled each time a different set of faults is configured. Therefore, faults cannot be easily reconfigured when performing a software test. As a result, it is time-consuming to verify the behavior of a test code under various faulty conditions.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for dynamic fault configuration in software testing. In one embodiment, a computer system hosting a service platform receives a request from a test program to register a list of controllers during runtime of the service platform. Each of the registered controllers controls the generation of a different fault. The test program triggers the execution of a service to be tested on the service platform. During execution of the service, a predefined condition is encountered. A fault is generated if one of the registered controllers controls the fault generation associated with the predefined condition. Based on the generation of the fault, the behavior of the service can be verified.

According to one embodiment of the invention, fault injection can be automated. A test program can inhibit the execution of certain code paths in the tested service code and force the execution of some other code paths by having selective controllers registered. By changing the list of registered controllers, a test program can dynamically change the faults injected into a service under test. As a result, the faulty behavior of the service can be analyzed and verified.

In one embodiment, a test program can register and unregister the controllers and, therefore, dynamically configure (and reconfigure) the faults, during runtime of the service platform without any code recompilation. Initially, a set of controllers can be registered and a corresponding set of faults can be injected into a tested service. In a subsequent test, a different set of controllers can be registered. As a result, different faults can be generated in the subsequent test run while the service platform continues running.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
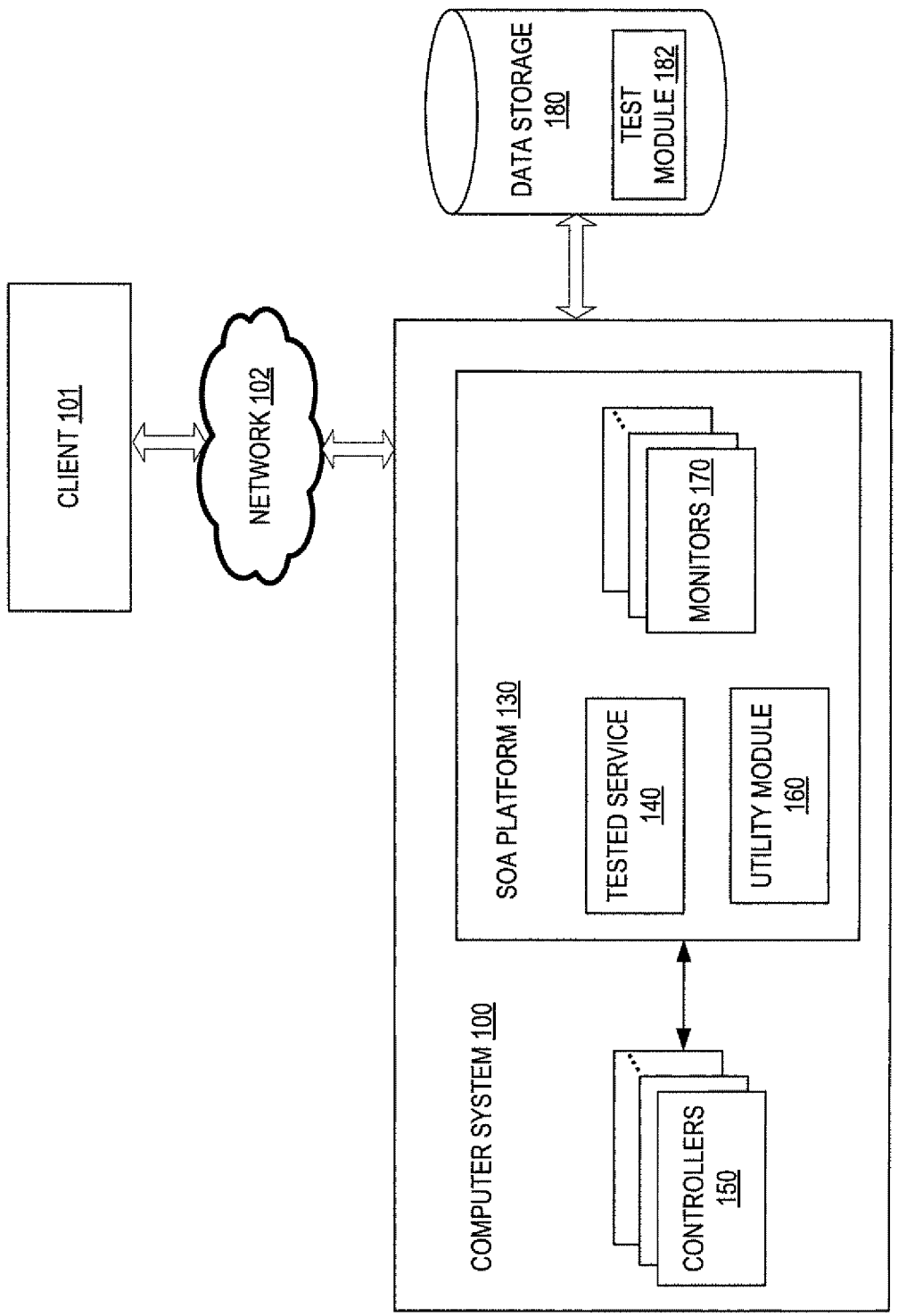
FIG. 1 is a block diagram of a computer system in which some embodiments of the invention may be implemented.

FIG. 1 is a block diagram that illustrates an exemplary computer system 100 in which embodiments of the present invention may operate. The computer system 100 may include one or more servers that host a Service Oriented Architecture (SOA) platform 130. An SOA platform is a popular architectural paradigm for the development of software applications. For example, a web service may provide an SOA platform to other applications via industry standard network, interfaces and protocols. In an alternative embodiment, the computer system 100 may host an application server or other service platforms. The computer system 100 may be one or more server computers, personal computers, desktop computers, laptop computers, or other forms of computing devices.

In one embodiment, the computer system 100 is coupled to one or more clients 101 connected via a network 102, which may be a private network (e.g., a local area network (LAN), wide area network (WAN), intranet, etc.) or a public network (e.g., the Internet). The client 101 may be a computing device such as, for example, a desktop computer, laptop computer, server, cellular phone, personal digital assistant (PDA), etc. In one embodiment, the client 101 is a server of an enterprise, but is a "client" with respect to the SOA platform 130. The client 101 interacts with the SOA platform 130 by exchanging messages via standard protocols, e.g., File Transfer Protocol (FTP), Hypertext Transfer Protocol (HTTP), etc. The client 101 runs client applications to generate messages that are to be processed by the services deployed on the SOA platform 130.

In one embodiment, a new service may be deployed on the SOA platform 130 to provide a service to the clients 101. The new service may need to be tested to verify its functionality and its behavior when a fault occurs. In one embodiment, a test module 182 (e.g., a test program) may be used to drive a test on the new service (referred to as a "tested service" 140). The test module 182 may reside in a data storage 180 coupled to the computer system 100 and executed by the computer system 100. The data storage 180 may include memory devices, such as flash drives, random access memory (RAM) or other volatile or non-volatile memory devices, and mass storage devices, such as magnetic or optical storage based disks, tapes or hard drives. In an alternative embodiment, the test module 182 may reside on and be executed by the client 101 to remotely invoke the tested service 140 on the SOA platform 130.

In one example, the tested service 140 may include a data access service offered by an application server to retrieve or store data in a database. As another example, the tested service 140 may be an Enterprise Service Bus (ESB) archive which processes incoming messages and is capable of message handling, filtering, data transformation, content-based routing, and message repositories. A fault incurred by the tested service 140 may include a transaction error (such as attempting to modify a read-only file), a messaging error (such as loss of a message), etc.

According to one embodiment of the present invention, the test module 182 can select a number of fault injection controllers 150 (also referred to as "controllers") from a pool of controllers 150 based on the faults a user (e.g., a testing engineer) wishes to inject into the tested service 140. The test module 182 then registers the selective controllers 150 with a utility module 160 of the SOA platform 130. Each of the controllers 150 controls the generation of a different fault. During the runtime of the SOA platform 130, the test module 182 can register the selected controllers 150, or unregister any of the already-registered controllers 150, to cause different faults to be injected into the tested service 140.

In one embodiment, one or more monitors 170 are embedded within the SOA platform 130 to monitor the occurrences of pre-defined conditions during the execution of the tested service 140, and report the occurrences to the utility module 160. In one embodiment, the pre-defined conditions in the tested service code and the monitors 170 are implemented using Aspect Oriented Programming (AOP).

Before further describing the fault injection, some terminology relating to the Aspect Oriented Programming (AOP) is explained as follows. In object-oriented programming (e.g., Java, C++, etc.), functions of a computer program can be divided into interdependent modules. Each module is a component of a program that performs a specific set of related behaviors. Design features that affect multiple different modules are said to be crosscutting concerns. Examples of crosscutting concerns include security, data logging, session management, authentication, performance measurement, etc. AOP is a programming approach that was developed to manage crosscutting concerns. In AOP, crosscutting concerns are encapsulated in a number of program modules called aspects. An aspect includes a pointcut and advice. A pointcut is program code that picks out certain join points (e.g., method calls, exception throws, etc.) and values at those points. Advice is code, including one or more operations, which can be executed when a join point is reached. Advice defines crosscutting functionality that transparently forces a modification to program modules or adds additional functionality to program modules. An embodiment using AOP will be described in greater details with reference to FIG. 2.

Embodiments of the present invention simulate a fault inside a compiled and integrated product (e.g., services offered by the SOA platform 130). It is unnecessary to modify or recompile the source code of the tested service 140 or the SOA platform 130 (such modification or recompilation would invalidate all other tests). As every single automated test can register and unregister its own fault injection controllers 150, the responsibility of configuring the faults lies completely upon the test program. As the registering and unregistering of controllers 150 can be performed while the service platform (e.g., the SOA platform 130) is up and running, the testing environment is highly dynamic.

Figure 2:
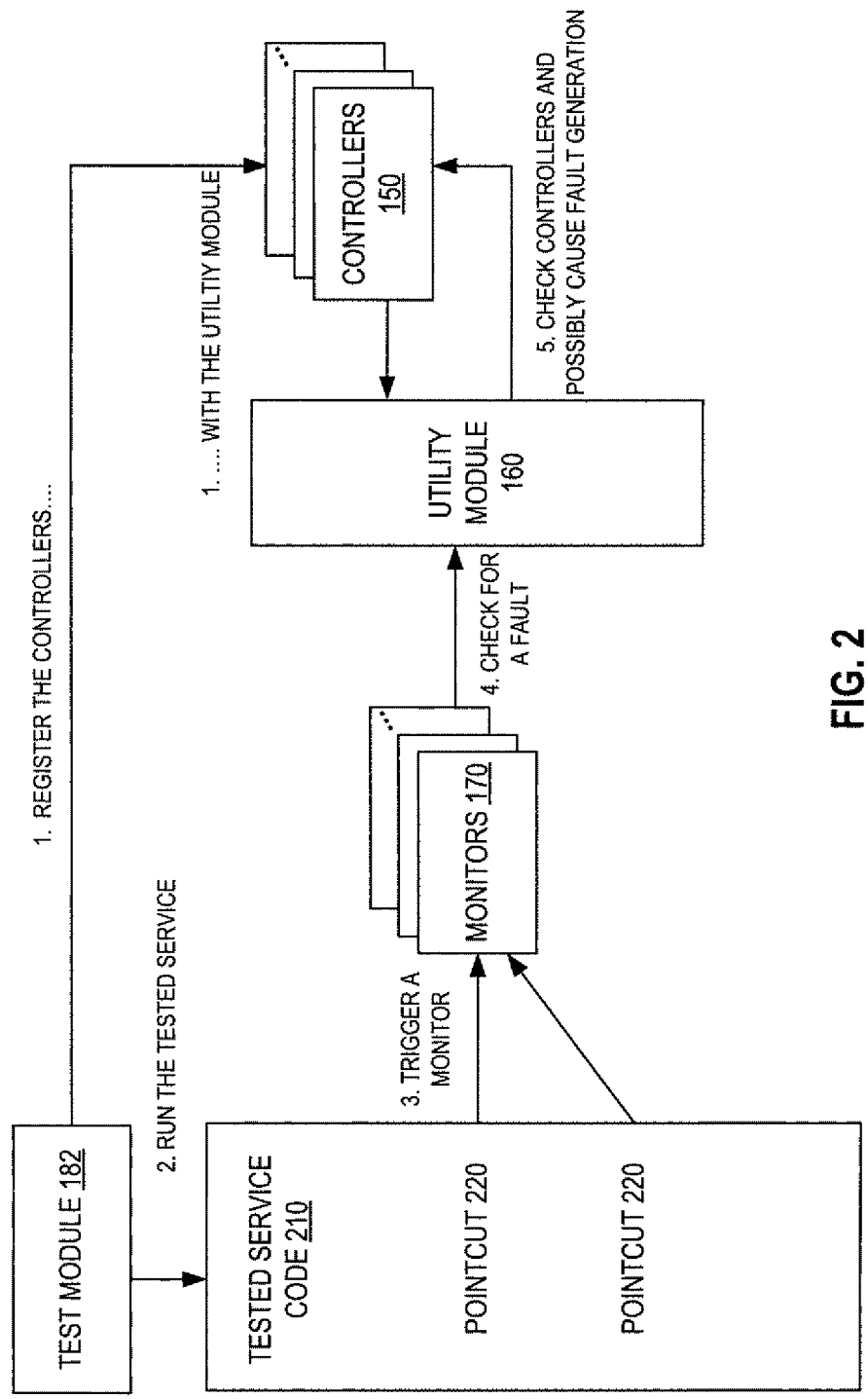
FIG. 2 is a diagram of one embodiment of the components that perform dynamic fault configuration using Aspect Oriented Programming (AOP).

FIG. 2 is a block diagram illustrating an embodiment of the components that perform dynamic fault injection using AOP. In one embodiment, the test module 182 first registers a selective list of controllers 150 with the utility module 160.

The controllers 150 may be implemented as serializable classes that are sent to the service platform (e.g., the SOA platform 130) from the test module 182 and deployed on the service platform. After registration of the controllers 150, the test module 182 starts running the tested service 140, which has also been deployed on the service platform. The tested service code 210 may include a number of pointcuts 220, each of which defines a different condition that may trigger a fault. When the execution of the tested service code 210 encounters any of the pointcuts 220, a corresponding advice code implementing the monitor 170 is triggered to pass a request (e.g., in the form of an indication of the encountered condition) to the utility module 160. The utility module 160 may be implemented as an MBean (Managed Bean, which is a Java Object) that maintains a list of the registered controllers 150. The utility module 160 checks with the registered controllers 150 regarding fault generation, by passing the indication of the condition to the registered controllers 150. Based on the indication of the condition, each register controller 150 determines whether it should generate a fault (e.g., an exception). If a fault is generated, the code path in the tested service code 210 that handles the fault can be executed, analyzed and verified.

An example of two pointcuts 220 are provided as follows:
execution(public Message $instanceof{AbstractActionLifecycle}->*(Message));
and
execution(public Message $instanceof{ActionPipelineProcessor}->*(Message)).

In the above example, each of the two pointcuts is executed upon execution of a public method that accepts one parameter of type "Message" and returns "Message." The public method is in a class that is the ancestor of AbstractActionLifecycle (for the first pointcut) or the ancestor of ActionPipelineProcessor (for the second pointcut). It is understood that other pointcuts 220 can be defined and included in the tested service code 210.

In one embodiment, the same monitor 170 can be used for multiple pointcuts 220. The advice code that implements the monitor 170 can be in a method that receives an object of type "Invocation" that describes the pointcut 220 where the method has been triggered. This object can be further passed to the controllers 150 via the utility module 160 to allow the controllers 150 to determine whether or not to cause the generation of a fault.

In one embodiment, a fault is typically implemented as a descendant of the RuntimeException. Fault generation depends completely on its corresponding controller 150. A fault can be defined in its corresponding controller 150 by throwing an exception, such as:

```
if(<condition(s) to cause a fault>) {
    throw new Fault_1( );
}
```

Thus, when the controller 150 is informed of the occurrence of the pre-defined condition(s), the controller 150 can raise an exception Fault_1. In one embodiment, the controllers 150 can be written in any language that can be translated to the bytecode of a Java Virtual Machine (JVM).

Figure 3:
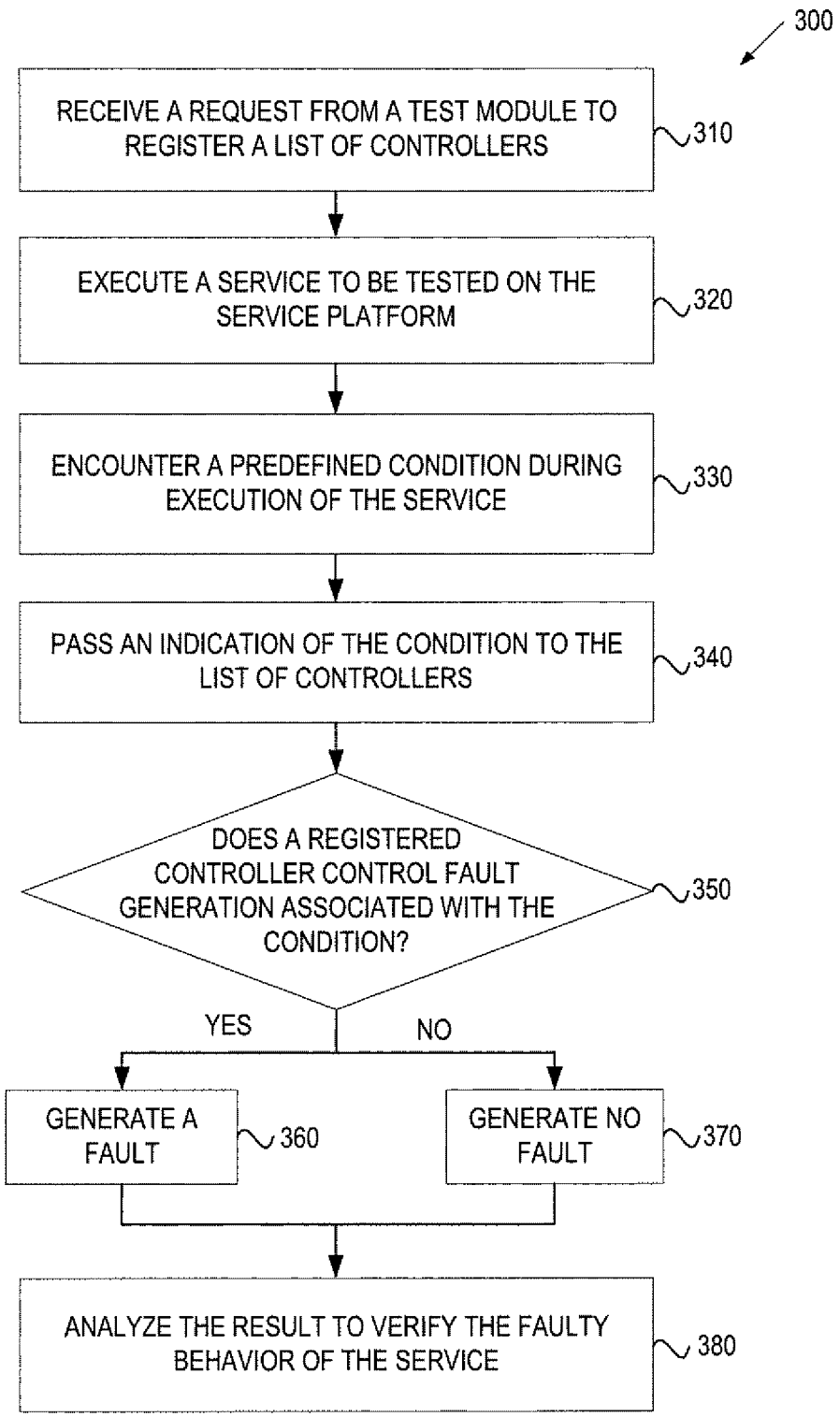
FIG. 3 is a flow diagram of one embodiment of a method for performing dynamic fault configuration.

FIG. 3 is a flow diagram illustrating one embodiment of a method 300 for dynamic fault configuring. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the computer system 100 of FIG. 1.

Referring to FIG. 3, in one embodiment, the method 300 begins when the computer system 100 hosting a service platform receives a request from a test program (e.g., the test module 182 of FIG. 1) to register a list of controllers 150 during the runtime of the service platform (block 310). The service platform may be the SOA platform 130, an application server, or other service-providing platforms. After registration of the controllers 150, the test module 182 starts running a service (e.g., the tested service 140), e.g., by sending a message to the service that has been deployed on the service platform (block 320). During execution of the tested service 140, the computer system 100 may encounter a predefined condition in the tested service code (block 330). The service platform may include a number of modules for passing an indication of the condition to the registered controller 150 (block 340). Examples of the modules may include the monitors 170 and the utility module 160 of FIG. 1. Each of the controllers 150 then determines whether a fault should be generated in response to the occurrence of the condition. If one of the registered controllers 150 controls the fault generation associated with the condition (block 350), then the controller 150 generates the fault (block 360). If none of the registered controllers 150 control the fault generation associated with the condition (block 350), then no fault is generated at this point (block 370). The result (including faults) generated by the tested service 140 is analyzed to verify the behavior of the tested service 140 (block 380).

Figure 4:
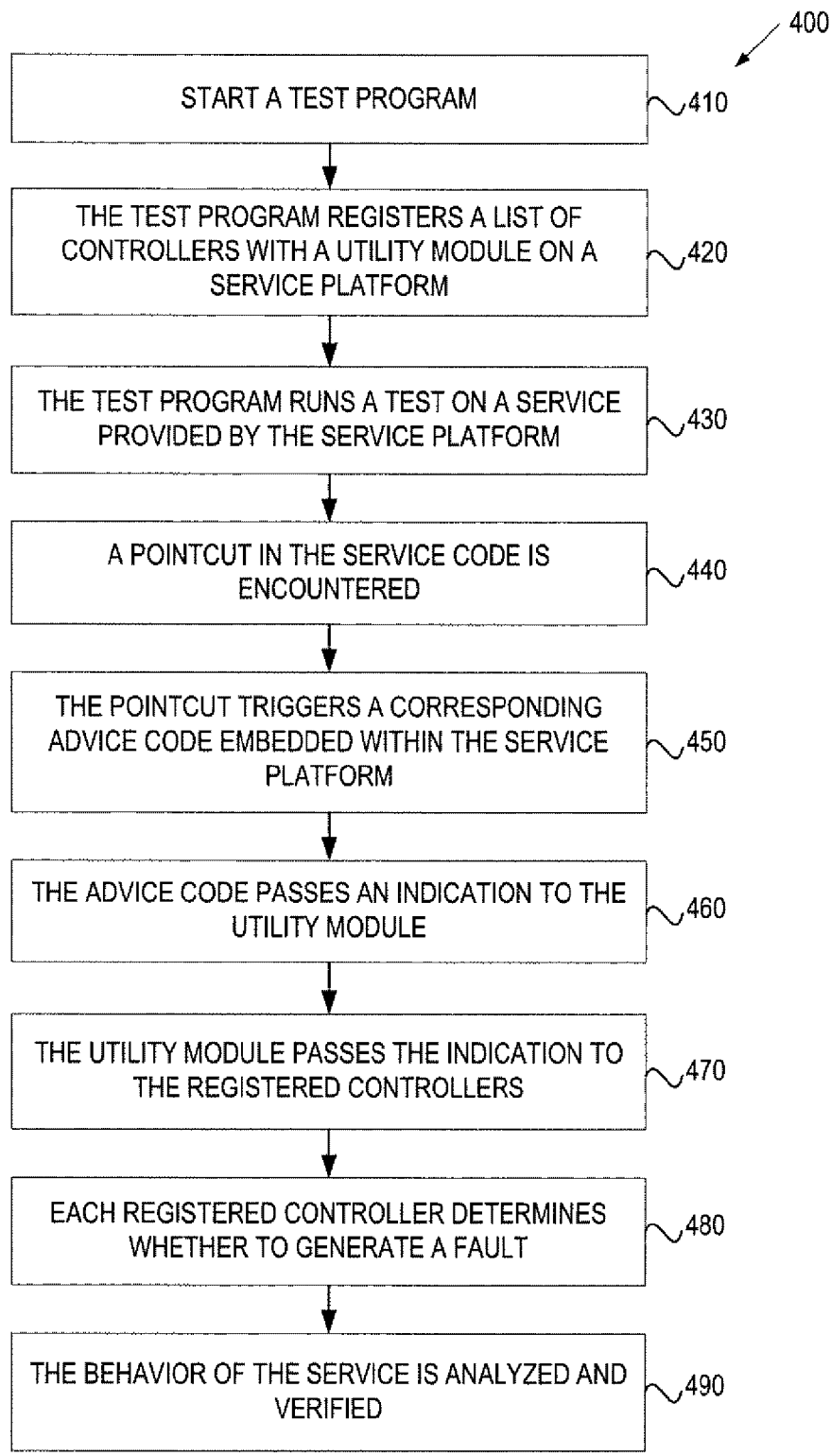
FIG. 4 is a flow diagram of one embodiment of a method for performing dynamic fault configuration using AOP.

FIG. 4 is a flow diagram illustrating one embodiment of a method 400 that uses AOP to dynamically configure faults. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the computer system 100 of FIG. 1.

Referring to FIG. 4, in one embodiment, the method 400 begins when a test program (e.g., the test module 182 of FIG. 1) is started (block 410). Initially, the test program registers a list of controllers 150 with the utility module 160 hosted by a service platform (e.g., the SOA platform 130) (block 420). Subsequently, the test program starts to run a test on a service provided, or to be provided, by the service platform (block 430). During execution of the service code, a pointcut embedded in the service code is encountered (block 440). The pointcut triggers a corresponding advice code (e.g., the monitor 170) embedded within the service platform (block 450). The advice code passes an indication of the pointcut, e.g., an object indicating the conditions defined in the pointcut, to the utility module 160 (block 460). The utility module 160 further passes the indication to the list of registered controllers 150 (block 470). Each of the registered controllers 150 then determines whether to generate a fault based on the information passed to the controllers 150 (block 480), and generates the fault if the controller 150 controls the fault generation associated with the encountered pointcut. As a result, the behavior of the service under test can be analyzed and verified (block 490).

Figure 5:
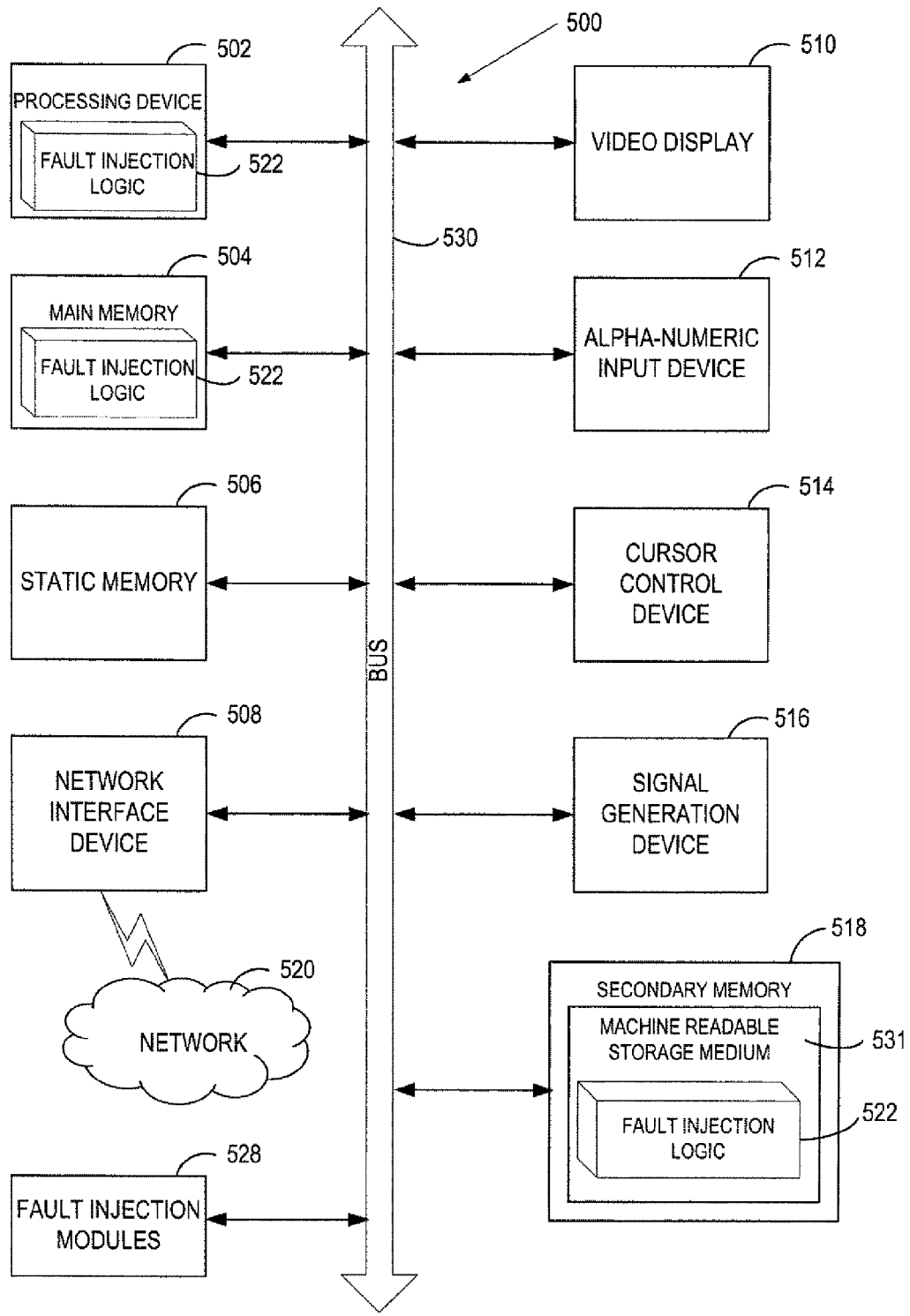
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute fault injection logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., fault injection logic 522) embodying any one or more of the methodologies or functions described herein (e.g., the test module 182, the tested service 140, the controllers 150, the monitors 170 and the utility module 160 of FIG. 1). The fault injection logic 522 may also reside, completely or at least partially, within the main memory 504 and/or within the processing device 502 during execution thereof by the computer system 500; the main memory 504 and the processing device 502 also constituting machine-readable storage media. The fault injection logic 522 may further be transmitted or received over a network 520 via the network interface device 508.

The machine-readable storage medium 531 may also be used to store the fault injection logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include fault injections modules 528 for implementing the functionalities of the test module 182, the tested service 140, the controllers 150, the monitors 170 and the utility module 160 of FIG. 1. The module 528, components and other features described herein (for example in relation to FIG. 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "executing", "generating", "verifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMS), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    registering, by a processing device, a plurality of controllers during runtime of a service platform code;
    configuring a plurality of faults associated with the plurality of controllers in response to the registering of the plurality of controllers;
    executing a first service to be tested on the service platform code and encountering a condition during the execution of the first service;
    sending an indication of the condition to the plurality of registered controllers;
    evaluating, by each of the plurality of registered controllers, whether a first fault among the plurality of faults should be generated in view of the condition;
    detecting that at least one registered controller among the plurality of registered controllers controls fault generation associated with the condition in view of the evaluation by each of the plurality of registered controllers;
    generating the first fault among the plurality of faults in response to the detection that the at least one registered controller controls the fault generation;
    unregistering, by the processing device, one of the plurality of registered controllers without recompiling the service platform code; and
    in response to the unregistering, modifying, by the processing device, the configuration of the plurality of faults in the plurality of registered controllers.

2. The method of claim 1, wherein the executing a first service further comprises:
    upon encountering the condition during execution of the first service, passing an indication of the condition to the plurality of registered controllers; and
    determining, by each of the plurality of registered controllers, whether to generate the first fault in view of the indication.

3. The method of claim 1, further comprising:
embedding a pointcut associated with the condition into a code of the first service under test;
triggering a corresponding code when the pointcut is encountered during execution of the first service; and
passing an indication of the condition to a utility module to check with the plurality of registered controllers for fault generation.

4. The method of claim 1, further comprising:
selectively registering and unregistering the plurality of controllers during the runtime of the service platform without recompiling service platform code; and
changing, during the runtime of the service platform, a faulty behavior of the service by the selectively registering and unregistering the plurality of controllers.

5. The method of claim 1 further comprising verifying behavior of the first service in view of the generation of the first fault.

6. The method of claim 1 further comprising:
in response to the modifying, executing a second service to be tested on the service platform code, wherein the second service is different from the first service.

7. The method of claim 6 further comprising:
in response to executing the second service, generating a second fault among the plurality of faults in response, wherein the second fault is different from the first fault.

8. A system comprising:
a memory;
a processing device, operatively coupled to the memory, wherein the processing device is to:
register a plurality of controllers during runtime of a service platform code;
configure a plurality of faults associated with the plurality of controllers in response to the registering of the plurality of controllers;
execute a first service to be tested on the service platform code and encounter a condition during the execution of the first service;
send an indication of the condition to the plurality of registered controllers;
evaluate, by each of the plurality of registered controllers, whether a first fault among the plurality of faults should be generated in view of the condition;
detect that at least one registered controller among the plurality of registered controllers controls fault generation associated with the condition in view of the evaluation by each of the plurality of registered controllers;
generate the first fault among the plurality of faults in response to the detection that the at least one registered controller controls the fault generation
unregister one of the plurality of registered controllers without recompiling the service platform code; and
in response to the unregistering, modify the configuration of the plurality of faults in the plurality of registered controllers.

9. The system of claim 8, wherein the processing device is further to:
embed a pointcut associated with the condition into a code of the first service under test;
trigger a corresponding code when the pointcut is encountered during execution of the first service; and
pass an indication of the condition to a utility module to check with the plurality of registered controllers for fault generation.

10. The system of claim 8, wherein the processing device is further to:
verify behavior of the first service in view of the generation of the first fault.

11. The system of claim 8, wherein the processing device is further to:
in response to the modifying, execute a second service to be tested on the service platform code, wherein the second service is different from the first service.

12. The system of claim 11, wherein the processing device is further to:
in response to executing the second service, generate a second fault among the plurality of faults in response, wherein the second fault is different from the first fault.

13. A non-transitory computer readable storage medium comprising instructions that, when executed by a processing device, cause the processing device to:
register, by the processing device, a plurality of controllers during runtime of a service platform code;
configure a plurality of faults associated with the plurality of controllers in response to the registering of the plurality of controllers;
execute a first service to be tested on the service platform code and encounter a condition during the execution of the first service;
send an indication of the condition to the plurality of registered controllers;
evaluate, by each of the plurality of registered controllers, whether a first fault among the plurality of faults should be generated in view of the condition;
detect that at least one registered controller among the plurality of registered controllers controls fault generation associated with the condition in view of the evaluation by each of the plurality of registered controllers;
generate the first fault among the plurality of faults in response to the detection that the at least one registered controller controls the fault generation;
unregister, by the processing device, one of the plurality of registered controllers without recompiling the service platform code; and
in response to the unregistering, modify, by the processing device, the configuration of the plurality of faults in the plurality of registered controllers.

14. The non-transitory computer readable storage medium of claim 13, wherein to execute the first service, the processing device is further to:
upon encountering the condition during execution of the first service, pass an indication of the condition to the plurality of registered controllers; and
determine, via each of the plurality of registered controllers, whether to generate the first fault in view of the indication.

15. The non-transitory computer readable storage medium of claim 13, wherein the processing device is further to:
embed a pointcut associated with the condition into a code of the first service under test;
trigger a corresponding code when the pointcut is encountered during execution of the first service; and
pass an indication of the condition to a utility module to check with registered controllers for fault generation.

16. The non-transitory computer readable storage medium of claim 13, wherein the processing device is further to:
selectively register and unregister the controllers during the runtime of the service platform without recompiling service platform code; and
change, during the runtime of the service platform, a faulty behavior of the service by the selectively registering and unregistering the controllers.

17. The non-transitory computer readable storage medium of claim 13, wherein the processing device is further to verify behavior of the first service in view of the generation of the first fault.

18. The non-transitory computer readable storage medium of claim 13, wherein the processing device is further to:
   in response to the modifying, execute a second service to be tested on the service platform code, wherein the second service is different from the first service.

19. The non-transitory computer readable storage medium of claim 18, wherein the processing device is further to:
   in response to executing the second service, generate a second fault among the plurality of faults in response, wherein the second fault is different from the first fault.

* * * * *